United States Patent
Chakravarty et al.

(10) Patent No.: US 11,367,212 B2
(45) Date of Patent: Jun. 21, 2022

(54) VEHICLE POSE DETECTION WITH FIDUCIAL MARKER

(71) Applicant: Ford Global Technologies, LLC, Dearborn, MI (US)

(72) Inventors: Punarjay Chakravarty, Campbell, CA (US); Ramchandra Ganesh Karandikar, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 306 days.

(21) Appl. No.: 16/690,465

(22) Filed: Nov. 21, 2019

(65) Prior Publication Data

US 2021/0158564 A1 May 27, 2021

(51) Int. Cl.
| | | |
|---|---|---|
| G06T 7/73 | (2017.01) | |
| G06K 7/14 | (2006.01) | |
| G01C 21/30 | (2006.01) | |
| G06V 10/00 | (2022.01) | |

(52) U.S. Cl.
CPC .............. G06T 7/73 (2017.01); G01C 21/30 (2013.01); G06K 7/1417 (2013.01); G06K 7/1456 (2013.01); G06T 2207/10016 (2013.01); G06T 2207/20081 (2013.01); G06T 2207/30204 (2013.01); G06T 2207/30252 (2013.01)

(58) Field of Classification Search
CPC ............ G06T 7/73; G06T 2207/10016; G06T 2207/20081; G06T 2207/30204; G06T 2207/30252; G06T 7/74; G01C 21/30; G01C 21/3896; G01C 21/32; G06K 7/1417; G06K 7/1456; G06K 19/0717; G06K 19/0723; G06K 19/07762
See application file for complete search history.

(56) References Cited

U.S. PATENT DOCUMENTS

| | | | |
|---|---|---|---|
| 6,351,573 B1 * | 2/2002 | Schneider | G16H 20/40 |
| | | | 382/128 |
| 8,994,822 B2 | 3/2015 | Smitherman et al. | |
| 9,965,870 B2 | 5/2018 | Claveau et al. | |
| 10,088,553 B2 | 10/2018 | Zeng et al. | |
| 10,091,554 B1 * | 10/2018 | Newell | A61B 5/378 |
| 10,267,635 B2 | 4/2019 | Chen | |
| 11,136,022 B2 * | 10/2021 | Matta | B60W 60/005 |

(Continued)

FOREIGN PATENT DOCUMENTS

WO 200034803 A2 6/2000

OTHER PUBLICATIONS

Manami et al, (Visual Feedback Control of a Vehicle based on MHE directly using Partial Marker Information, Proceedings of the 2016 IEEE/SICE International Symposium on System Integration, Sapporo Convention Center, Sapporo, Japan, Dec. 13-15, 2016) (Year: 2016).*

*Primary Examiner* — Amara Abdi
(74) *Attorney, Agent, or Firm* — Frank A. MacKenzie; Bejin Bieneman PLC

(57) ABSTRACT

Based on an image from a stationary sensor, a marker displayed on one or more digital displays on a vehicle is detected. A first location and a first orientation of the marker in a coordinate system is determined by analyzing on pixels in the image. Based on a stationary sensor location and orientation from a map, a second location and a second orientation of the vehicle in the coordinate system is determined.

20 Claims, 3 Drawing Sheets

(56) References Cited

U.S. PATENT DOCUMENTS

| | | | |
|---|---|---|---|
| 2018/0259976 A1* | 9/2018 | Williams | G01C 21/3664 |
| 2018/0307941 A1 | 10/2018 | Holz et al. | |
| 2018/0356526 A1 | 12/2018 | Wang et al. | |
| 2019/0049566 A1 | 2/2019 | Adams et al. | |
| 2019/0087659 A1 | 3/2019 | Kaehler et al. | |
| 2019/0250603 A1* | 8/2019 | Tod | G05D 1/0033 |
| 2019/0355173 A1* | 11/2019 | Gao | G06T 17/05 |
| 2020/0334485 A1* | 10/2020 | Sameer | G06V 10/40 |
| 2020/0396384 A1* | 12/2020 | Hu | H04N 5/232411 |

* cited by examiner

VEHICLE POSE DETECTION WITH FIDUCIAL MARKER

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
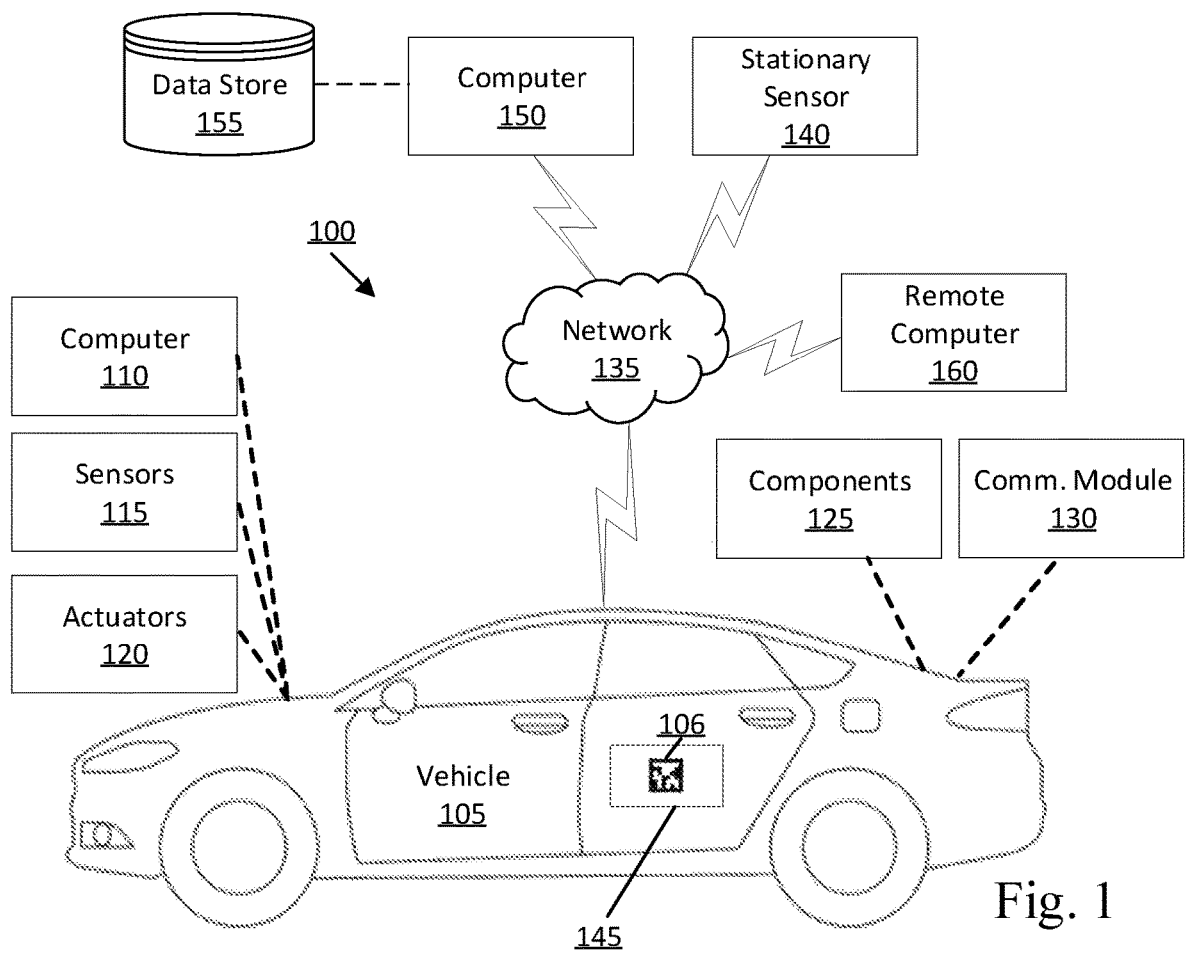
FIG. 1 illustrates a diagram illustrating an example system for locating a vehicle with a marker.

A system includes a computer including a processor and a memory, the memory storing instructions executable by the processor to, based on an image from a stationary sensor, detect a marker displayed on one or more digital displays on a vehicle. The instructions further include instructions to determine a first location and a first orientation of the marker in a coordinate system by analyzing pixels in the image. The instructions further include instructions to, based on a stationary sensor location and orientation from a map, determine a second location and a second orientation of the vehicle in the coordinate system.

The marker can be an identifier of the vehicle.

The instructions can further include instructions to receive the map from a remote computer. The remote computer can be programmed to perform simultaneous localization and mapping (SLAM) to generate the map, including the stationary sensor location and orientation, and to transmit the map to the computer.

The instructions can further include instructions to, upon determining the second location and the second orientation of the vehicle in the coordinate system, include the vehicle in the map The instructions can further include instructions to determine dimensions of the vehicle based on the marker.

The instructions can further include instructions to provide the map to the vehicle and operate the vehicle based on the map.

The instructions can further include instructions to identify the one or more digital displays based on video data from the stationary sensor.

The orientation can include a pitch, a yaw, and a roll.

The instructions can further include instructions to determine the first location and the first orientation of the marker based on at least one of marker indicia and dimensions of the marker.

The instructions can further include instructions to determine the first location and the first orientation of the marker by inputting the image from the stationary sensor into a machine learning program.

The instructions can further include instructions to identify the marker based on a visual pattern of the marker.

The instructions can further include instructions to identify the marker based on comparing marker indicia in the image to marker indicia in stored marker images.

A method includes, based on an image from a stationary sensor, detecting a marker displayed on one or more digital displays on a vehicle. The method further includes determining a first location and a first orientation of the marker in a coordinate system by analyzing pixels in the image. The method further includes, based on a stationary sensor location and orientation from a map, determining a second location and a second orientation of the vehicle in the coordinate system.

The method can include determining the first location and the first orientation of the marker based on at least one of marker indicia and dimensions of the marker.

The method can include determining the first location and the first orientation of the marker by inputting the image from the stationary sensor into a machine learning program.

The marker can be an identifier of the vehicle.

The method can include identifying the marker based on a visual pattern of the marker.

The method can include identifying the marker based on comparing marker indicia in the image to marker indicia in stored marker images.

The method can include identifying the one or more digital displays based on video data from the stationary sensor.

The orientation can include a pitch, a yaw, and a roll.

Further disclosed herein is a computing device programmed to execute any of the above method steps. Yet further disclosed herein is a computer program product, including a computer readable medium storing instructions executable by a computer processor, to execute an of the above method steps.

FIG. 1 illustrates an exemplary system 100 for locating a vehicle 105 with a marker 106. A computer 150 remote from the vehicle 105 is programmed to, based on an image from a stationary sensor 140, detect a marker 106 displayed on one or more digital displays 145 on the vehicle 105. The computer 150 is further programmed to determine a first location and a first orientation of the marker 106 in a coordinate system by analyzing pixels in the image. The computer 150 is further programmed to, based on a stationary sensor 140 location and orientation from a map, determine a second location and a second orientation of the vehicle 105 in the coordinate system.

Vehicle sensors 115 can provide data concerning a route traveled by the vehicle 105 and/or about objects in the vehicle's 105 environment. In order to operate the vehicle 105, the vehicle computer 110 determines a path based at least on a vehicle 105 first location and first orientation determined according to vehicle sensors 115. Advantageously, to supplement and/or replace data from vehicle sensors 115, a computer 150 can receive a map specifying a stationary sensor 140 location and orientation in an environment and image data from the stationary sensor 140 outside the vehicle 105 indicating a marker 106 on a vehicle 105. The computer 150 can then determine a second location and a second orientation of the vehicle 105 in the environment based on the first location and the first orientation of the marker 106 with respect to the stationary sensor 140. The computer 150 can add the vehicle 105 to the map of the environment based on the second location and second orientation of the vehicle 105 and provide the map to the vehicle computer 110, which can advantageously reduce processing and/or processing time for the vehicle computer 110 to operate the vehicle 105 in the environment.

The vehicle 105 includes a vehicle computer 110, sensors 115, actuators 120 to actuate various vehicle components 125, and a vehicle communications module 130. The communications module 130 allows the vehicle computer 110 to communicate with one or more infrastructure elements 140 and the computer 150, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, to a stationary sensor 140 (typically via direct radio frequency communications), and/or (typically via the network 135) to the computer 150. The communications module 130 could include one or more mechanisms, such as a transceiver, by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the computer 150, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The vehicle 105 includes one or more digital displays 145. A digital display 145 may be implemented using chips, electronic components, and/or light emitting diode (LED), liquid crystal display (LCD), organic light emitting diode (OLED), etc. The digital display 145 may be attached to an exterior surface of the vehicle 105 or may be manufactured to be a part of the exterior surface of the body. The computer 150 may be programmed to identify the digital display(s) 145 on the vehicle 105, e.g., using image analysis techniques, upon receiving video data from the stationary sensor 140.

The digital display 145 may receive images, e.g., frames in a stream of video data, from the vehicle computer 110, e.g., via a vehicle communication network, etc. A digital display 145 typically has a refresh rate which may be specified in frames per second (fps) or Hertz (Hz). For example, the digital display 145 may have a refresh rate of 30 fps or 30 Hz (i.e., replacing/refreshing a displayed frame 30 times per second). In one example, the vehicle computer 110 may be programmed to transmit a sequence of frames to the digital display 145 based on the refresh rate of the digital display 145, e.g., transmitting a set of 30 frames each second to the digital display 145. In another example, the vehicle computer 110 may be programmed to send frames with associated time stamps and the digital display 145 may be configured (i.e., include programming and hardware to execute such programming) to output the received frames based on the time stamp of each frame.

The vehicle computer 110 may be programmed to actuate a digital display 145 on the vehicle 105 to display a first set of content and/or a second set of content. The first set of content may include conventional digital still or moving (i.e., video) images (e.g., a vehicle 105 display 145 could be used to provide an advertisement, textual information, a logo, etc.). The second set of content may include the marker 106. The vehicle computer 110 may, for example, actuate the digital display 145 to display the first set of content for a time duration above a threshold and to display the second set of content immediately after the first set of content for a time duration below the threshold. The threshold can be determined based on an amount of time generally known for displaying content to be detected—or not detected—by a human eye. That amount of time is generally known to be substantially 100 ms. Human vision typically recognizes (or renders as detectable) an image when viewed for more than 100 ms. On the other hand, a stationary sensor 140 may include an imaging sensor that allows detection of images displayed for less than 100 ms, e.g., a camera sensor may sample 100 images per second and thus may capture an image that is shown for more than 10 ms. Thus, the computer 150 may be programmed to detect the first and second set of contents whereas a human eye may recognize the first set of content, e.g., the advertisement, while not recognizing the second content, e.g., the marker 106.

The computer 150 includes a processor and a memory such as are known. The memory includes one or more forms of computer-readable media, and stores instructions executable by the computer 150 for performing various operations, including as disclosed herein. Further, the computer 150 can be accessed via the network 135, e.g., the Internet or some other wide area network. A data store 155 may be a memory of the computer 150 and/or a conventional data store, e.g., hard disk drives, solid state drives, servers, or any volatile or non-volatile media, communicatively coupled to the computer 150, including possibly via a network 135.

The data store 155 typically includes a plurality of data records. Each data record can be substantially uniquely identified by an identifier that can be decoded from a marker 106. Each data record identified by a marker 106 identifier includes data about a vehicle 105, including a description of vehicle 105 dimensions. In the present context, vehicle 105 dimensions are a three-dimensional description of the vehicle 105, i.e., data from which a space that the vehicle 105 will occupy in a physical environment can be predicted. In the present context, a dimension is a measurable extent along a line, e.g., a length, a width, and/or a height. The vehicle 105 can be represented by one or more regular geometric shapes such as one or more rectangular solids; in this example, the vehicle 105 geometry could be provided by giving a length, width, and height of the rectangular solid. A data record identified by a marker 106 identifier can alternatively or additionally include a three-dimensional model of the vehicle 105; a space that the vehicle 105 will occupy in a physical environment can be predicted from a second location and a second orientation of the vehicle 105, determined as described below, in combination with the three-dimensional model. The three-dimensional data model includes a model of a vehicle 105 along with the marker 106 in three-dimensions and models the vehicle 105 and marker 106 to represent them in real-world space. A record for a marker 106 typically also includes data specifying a marker 106 location and orientation on the vehicle 105, e.g., a digital display 145, so that the second location and second orientation of the vehicle 105 can be determined from analysis of a stationary sensor 140 image of the vehicle 105 including the marker 106.

A remote computer 160 is a computer that is external to, and typically geographically remote from a vehicle 105, and can be a conventional computing device, i.e., including one or more processors and one or more memories, programmed to provide operations such as disclosed herein. For example, the remote computer 160 may be a remote vehicle computer, an infrastructure computer, etc., Alternatively, the remote computer 160 may be a cloud-based server. Further, the remote computer 160 can be accessed via the network 135, e.g., the Internet or some other wide area network.

The remote computer 160 can receive image data about an environment, e.g., from the stationary sensor(s) 140, from sensors 115 mounted on vehicles 105, etc. The data about an environment can be collected in the coordinate system, i.e., a conventional Cartesian coordinate system having an origin at a real-world reference point, e.g., a global position system (GPS) reference point. The remote computer 160 can then perform Simultaneous Localization and Mapping (SLAM) to generate a map of the environment. A map of an environment, in the context of the present disclosure, is a digital map including 3D location coordinates of points on surfaces, e.g., a road surface, traffic signs, buildings, vegetation, etc., within the mapped environment. An environment is defined by an area of the ground surface and includes a volume over the specified ground surface. The area of the ground surface is defined by geographic landmarks and/or geo-coordinates. Location coordinates of a point in environment, e.g., a point on a road surface, may be specified by X, Y, and Z coordinates, e.g., in a Cartesian coordinate system. X and Y coordinates, i.e., horizontal coordinates, may be, e.g., global positioning system (GPS) coordinates (i.e., latitude and longitude coordinates) or the like, and a Z coordinate may specify a vertical component to a location, i.e., a height (or elevation) of a point from a specified horizontal reference plane, e.g., sea or ground level. The remote computer 160 can transmit the map to the computer 150, e.g., via the network 135.

The stationary sensor 140 can provide digital images, e.g., as frames of video in a compressed format such as MPEG or the like. MPEG refers to a set of standards generally promulgated by the International Standards Organization/International Electrical Commission Moving Picture Experts Group (MPEG). Each frame in video data from the stationary sensor 140 can be a specified number of pixels wide by a specified number of pixels tall. A marker 106 can be identified in a frame, including location(s) of pixels in the image used to depict the marker 106, according to various image or pattern recognition techniques, and then coordinates of the marker 106 in the frame can be determined as further described below.

The stationary sensor 140 can be deployed in a fixed or stationary manner, e.g., mounted to a pole, positioned on a non-moving truck, mounted to a building, etc., within the environment. The stationary sensor 140 is included in the map of the environment. That is, the map includes a pose of the stationary sensor 140 in coordinates defined with respect to the coordinate system. A pose of an object such as a stationary sensor 140, the marker 106, or the vehicle 105 means an orientation (e.g., a yaw, a pitch, and a roll, as discussed below) and a location (e.g., a set of coordinates specifying a position in a coordinate system, e.g., X, Y, Z coordinates). For example, the pose of the stationary sensor 140 is the stationary sensor 140 location and orientation, e.g., in a Cartesian coordinate system such as referenced above. As another example, the pose of the marker 106 specifies the first location and the first orientation of the marker 106 with respect to the coordinate system. The pose of the stationary sensor 140 can be a basis for determining a pose, i.e., a second location and a second orientation, of the vehicle 105 in the coordinate system upon identifying the pose of marker 106 in a frame of video data from the stationary sensor 140.

Figure 2A:
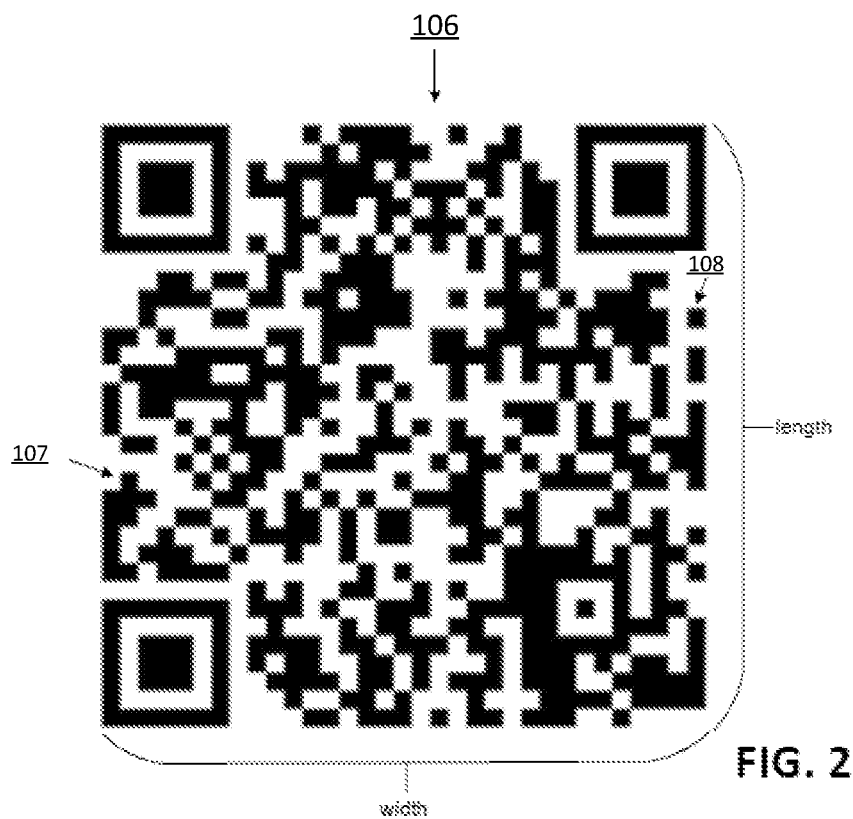
FIGS. 2A-2B are illustrations of example markers.
Figure 2B:
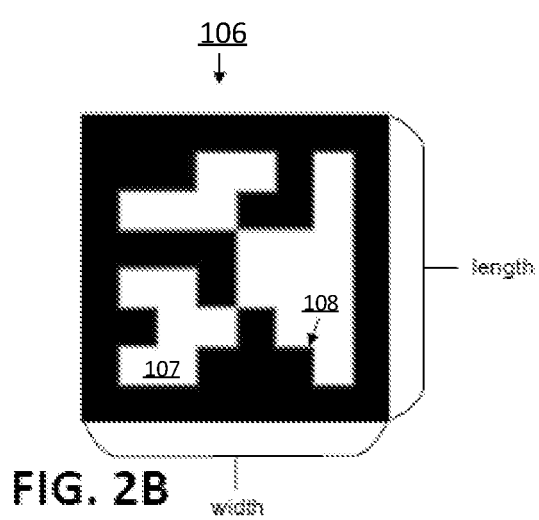

The marker 106 can be any visual pattern, e.g., a pattern of letters and/or numbers, a barcode, or other shapes, lines, or markers (e.g., as could be provided in a corporate logo or the like), that identifies a vehicle 105. The marker 106 can be referred to as a fiducial marker 106. A fiducial marker 106 is an object placed in the field of view of an imaging system which appears in the image produced, for use as a point of reference or a measurement. For example, as shown in FIG. 2A, the fiducial marker 106 can be what is known as a Quick Response (QR) code; as is known, a QR code may be used to encode an identifier that may be decoded upon acquiring an image of the QR code. As another example, as shown in FIG. 2B, a fiducial marker 106 can include a number of ArUco fiducial marks. ArUco fiducial marks are two-dimensional (2D) patterns from a library of fiducial marks described at www.uco.es/grupos/ava/node/26, "Aplicaciones de la Vision Artificial", University of Cordoba, Spain, May 15, 2019. ArUco fiducial marks are designed to be read by machine vision software that can determine a pose with respect to the coordinate system for each ArUco fiducial mark included in a fiducial marker 106 by processing a 2D (two-dimensional) image of the fiducial marker 106. The ArUco marker has a simpler pattern than the QR code and, therefore, typically requires less processing and/or less processing time to decode and/or analyze.

The computer 150 can, for example, identify the marker 106 based on the visual pattern, e.g., using pattern recognition techniques. As another example, the computer 150 can identify the marker 106 based on comparing the marker 106 in the image to stored marker images. In such an example, the computer 150 can retrieve the stored marker images, e.g., from the data store 155, upon detecting a marker 106 in the image from the stationary sensor 140.

A stationary sensor 140 can provide data to determine a pose of a fiducial marker 106 shown on a vehicle 105. For example, a digital display 145 mounted on a vehicle 105 roof, door, etc., can display a fiducial marker 106. When the vehicle 105 passes into the field of view of a stationary sensor 140, an image (or a video image) of the vehicle 105 including the fiducial marker 106 can be acquired, and the computer 150 can determine the pose of the fiducial marker 106 with respect to the coordinate system from the image. For example, once a marker 106 is identified in a frame of stationary sensor 140 data, e.g., according to programming in a computer 150 implementing a pattern recognition technique, the computer 150 can retrieve a marker 106 data record from the data store 155. The marker 106 data record can specify dimensions of the marker 106, e.g., a length and a width, as well as specific indicia 107, 108 in the marker 106, e.g., according to an XY coordinate system.

Marker indicia 107, 108 are identifiable shapes or markings in a marker 106, e.g., an individual square mark in a marker 106, that can be identified by the computer 150 in an image of the marker 106. That is, the computer 150 can identify pixels in the marker 106 image representing the specific indicia 107, 108, e.g., by recognizing a shape or combination of shapes in the marker 106 image. A Euclidean, i.e., straight line, distance, e.g., measured in pixels, between first and second indicia 107, 108 in a marker 106 image can then be determined, e.g., by using the Pythagorean theorem to determine a distance between respective XY coordinates for two points in the marker 106 image.

The computer 150 (or the data store 155) can further store a table or the like specifying a first distance from the stationary sensor 140 indicated by respective numbers of pixels being included in a distance between first and second indicia 107, 108 in the marker 106 image. Further, a marker 106 data record can specify a second distance, i.e., a physical Euclidean or straight line distance between the indicia 107, 108. Based on the first distance and the second distance, the first location can be provided according to XYZ coordinates of the marker 106 in the coordinate system, e.g., according to principles of Euclidean geometry including the Pythagorean theorem.

A first orientation of a marker 106 according to the coordinate system can also be determined from a marker 106 image. For example, the coordinate system can define XY, XZ, and YZ planes. The computer 150 can determine respective angles of a line between the two points in the marker 106 and each of the XY, XZ, and YZ planes. These angles can be used to give pitch, yaw, and roll, i.e., orientation. For avoidance of doubt, the terms pitch, yaw, and roll have their plain and ordinary meanings herein. For example, with respect to a vehicle, pitch is rotation about a lateral axis, yaw is rotation about a vertical axis, and roll is rotation about a longitudinal axis (e.g., the lateral, vertical, and longitudinal axes of a vehicle could be, or could be parallel to, respective X, Y, and Z axes in an XYZ coordinate system). An orientation of an object such as a marker 106 or vehicle 105 can be specified according to a pitch, yaw, and roll.

As another example, the computer 150 can determine the pose of the marker 106 by inputting an image from the stationary sensor 140 including the vehicle 105 and the marker 106 into a machine learning program, e.g., a convolutional neural network (CNN). A CNN is a software program that can be implemented on a computing device that can be trained to input an image of the vehicle 105 and output the pose of the marker 106. A CNN includes a plurality of convolutional layers that extract hidden features from an input image of a vehicle 105 which are passed to a plurality of fully-connected layers that transform the hidden features into a pose of the marker 106. A CNN can be trained to perform marker 106 pose processing by processing a plurality of images of vehicles 105 including the displayed fiducial marker(s) 106 to determine a pose of the marker 106. The determined pose of the marker 106 is defined as "ground truth," because it was determined independently from the CNN. The CNN is trained by inputting an image of a vehicle 105 captured by the stationary sensor 140 and backpropagating results to be compared with the ground truth pose to determine a loss function. Training the CNN includes determining parameters for convolutional and fully-connected layers that minimize the loss function. When trained, a CNN can input an image of a vehicle 105 received from the stationary sensor 140 and output a pose, i.e., a first location and a first orientation, of the marker 106.

The computer 150 is programmed to determine a pose of the vehicle 105, i.e., the second location and the second orientation, with respect to the coordinate system. For example, the computer 150 can receive data describing the dimensions of the vehicle 105 and the marker 106 location and orientation on the vehicle 105 from the marker 106 data record retrieved upon identifying the marker 106 in the image data, as described above. Based on the pose of the marker 106 with respect to the coordinate system, the computer 150 can extrapolate the pose of the vehicle 105 with respect to the coordinate system using the data describing the dimensions of the vehicle 105 and the marker 106 location and orientation on the vehicle 105. That is, based on the data describing the dimensions of the vehicle 105 and the marker 106 location and orientation on the vehicle 105, the computer 150 can determine a vehicle 105 location and an orientation with respect to the marker 106. The computer 150 can then determine the second location and the second orientation of the vehicle 105 with respect to the coordinate system from the first location and the first orientation of the marker 106 with respect to the coordinate system based on the vehicle 105 location and orientation with respect to the marker 106.

The computer 150 may be programmed to determine the pose of the vehicle 105 based on one or more fiducial markers 106 displayed on the digital display(s) 145. For example, the computer 150 can determine the pose of the vehicle 105 with respect to the coordinate system based on one fiducial marker 106, as discussed above. As another example, the computer 150 can determine a first pose of the vehicle 105 with respect to the coordinate system from a first fiducial marker 106 displayed on one digital display 145 and a second pose of the vehicle 105 with respect to the coordinate system from a second fiducial marker 106 displayed on another digital display 145. The computer 150 could then average the poses of the vehicle 105 with respect to the coordinate system to provide a determined pose of the vehicle 105 with respect to the coordinate system, which can advantageously increase the accuracy of the determined pose as compared to the first and second poses.

The computer 150, upon determining the pose of the vehicle 105 with respect to the coordinate system, can include the pose of the vehicle 105 in the map. For example, the computer 150 can determine the dimensions of the vehicle 105 based on decoding the marker 106, as discussed above, allowing the vehicle 105 to be scaled for placement in the map. Additionally, the pose of the vehicle 105 and the map have coordinates corresponding to the coordinate system, allowing the vehicle 105 to be oriented for placement in the map. The computer 150 can then transmit the map of the environment, including the pose of the vehicle 105, to the vehicle computer 110, e.g., via the network 135.

The vehicle computer 110 may be programmed to operate the vehicle 105 based at least in part on the pose of the vehicle 105 and the map of the environment. For example, the vehicle computer 110 may be programmed to identify objects such as road edge(s), buildings, intersections, etc., based on the determined pose of the vehicle 105 and the map of the environment. In these circumstances, the vehicle computer 110 may be programmed to actuate one or more vehicle components 125 to operate the vehicle 105 around the environment. Alternatively, the computer 150 may be programmed to operate the vehicle 105 based on the pose of the vehicle 105 and the map of the environment. In these circumstances, the computer 150 can transmit instructions to the vehicle computer 110 specifying actuation of one or more vehicle components 125 to operate the vehicle 105.

The vehicle computer 110 may be programmed to embed a vehicle 105 identifier, e.g., a license plate number, a vehicle identification number (VIN), etc., into the fiducial marker 106 displayed on the respective vehicle display 145. Thus, the fiducial marker 106 may identify the vehicle 105 on which the marker 106 is displayed. In other words, a vehicle 105 identifier can be decoded from the fiducial marker 106. The computer 150 may be programmed to decode the vehicle 105 identifier from the fiducial marker 106 displayed on the vehicle display 145 and to broadcast, e.g., via the network 135, the vehicle 105 identifier and the pose of the vehicle 105. Thus, a vehicle computer 110 receiving a pose of the vehicle 105 and a vehicle 105 identifier may be programmed to determine, based on a stored vehicle 105 identifier, whether the received pose of the vehicle is the pose of the vehicle 105 or a pose of another vehicle. The vehicle computer 110 may be programmed to operate the vehicle 105 based on the received pose of the vehicle 105 upon determining that the received pose of the vehicle 105 is the respective pose of the vehicle 105. Additionally, or alternatively, the vehicle computer 110 may be programmed to accept instructions from the computer 150 specifying operation of the vehicle 105 upon determining that the received pose of the vehicle 105 is the respective pose of the vehicle 105.

Figure 3:
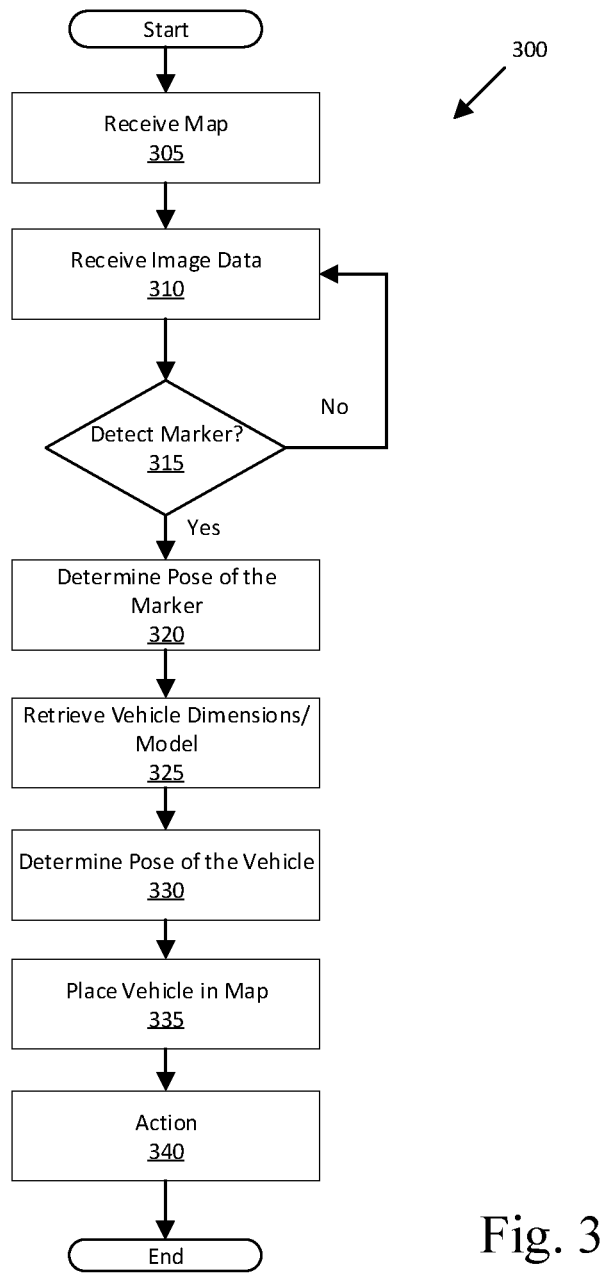
FIG. 3 is a flowchart of an example process for locating a vehicle with a marker.

FIG. 3 is flowchart of an example process for locating a vehicle with a marker. The process 300 beings in a block 305

In the block 305, the computer 150 receives a map of an environment from a remote computer 160, e.g., via the network 135. The remote computer 160 generates the map, e.g., using SLAM techniques, as discussed above, and then transmits the map to the computer 150. The map specifies location coordinates of points on surfaces, e.g., a road surface, traffic signs, buildings, vegetation, etc., within the mapped environment, as described above. For example, the map specifies a stationary sensor 140 location and orientation with respect to a coordinate system, e.g., a GPS coordinate system. The process 300 continues in a block 310.

In the block 310, the computer 150 receives image data from the stationary sensor 140, e.g., via the network 135. The image data can include a vehicle 105 and one or more digital displays 145 on the vehicle 105. The process 300 continues in a block 315.

In the block 315, the computer 150 determines whether a vehicle 105 marker 106 is detected in the image data, e.g., as displayed on a digital display 145. For example, the computer 150 analyzes the image data, e.g., according to conventional image analysis or pattern recognition techniques. As discussed above, the computer 150 can detect one or more markers 106 in the image data, e.g., one respective marker 106 on one or more digital displays 145. In the case that the computer 150 detects a marker 106, the process 300 continues in a block 320. Otherwise, the process 300 returns to the block 310.

In the block 320, the computer 150 determines a pose of the marker 106, i.e., a first location and a first orientation, in the coordinate system. For example, the computer 150 can be programmed to decode a marker 106 identifier from the marker 106, and to retrieve, e.g., from a data store 155, a record including data about the marker 106 as described above. Thus, the computer 150 could identify indicia 107, 108, as described above, and could further determine the pose of the marker 106, i.e., the first location and the first orientation, in the coordinate system based on the indicia 107, 108 and the stationary sensor 140 location and orientation, e.g., according to principles of Euclidean geometry including the Pythagorean theorem, as described above. The process 300 continues in a block 325.

In the block 325, the computer 150 retrieves, e.g., from the data store 155, data describing the vehicle 105 specified and/or included in the marker 106 record retrieved in the block 320. Typically, the data describing the vehicle 105 includes dimensions, e.g., height, width, and length, of the vehicle 105. Additionally, the data describes a marker 106 location and orientation on the vehicle 105. The data could additionally, or alternatively, include a three-dimensional model of the vehicle 105. The process 300 continues in a block 330.

In the block 330, the computer 150 determines a pose of the vehicle 105, i.e., a second location and a second orientation, in the coordinate system. For example, based on the pose of the marker 106 with respect to the coordinate system, the computer 150 extrapolates the pose of the vehicle 105 with respect to the coordinate system using the data describing the dimensions of the vehicle 105 and the marker 106 location and orientation on the vehicle 105, as described above. The process 300 continues in a block 335.

In the block 335, the computer 150 places the vehicle 105 in the map of the environment. The map has coordinates corresponding to the coordinate system, which allows the computer 150 to scale and orient the vehicle 105 for placement in the map based on the pose of the vehicle 105 in the coordinate system, as described above. The process 300 continues in a block 340.

In the block 340, the computer 150 could take one or more actions based on the determination of the pose of the vehicle 105 in the map. For example, the computer 150 can transmit the data, e.g., the map including the pose of the vehicle 105, to the vehicle computer 110, e.g., via the network 135. The vehicle computer 110 could then use the data transmitted by the computer 150 as a basis for operating the vehicle 105 in the environment. That is, the vehicle computer 110 could actuate one or more vehicle components 125 to operate the vehicle 105 in the environment based on the map, e.g., to navigate along roads and/or paths and to avoid obstacles such as other vehicles. In such an example, the vehicle computer 110 may accept the data based on a transmitted vehicle identifier matching a stored vehicle identifier, as described above. Alternatively, the computer 150 could use the data as a basis for generating instructions to actuate vehicle components 125 to operate the vehicle 105 in the environment. The computer 150 could then transmit the instructions to the vehicle computer 110. In these circumstances, the vehicle computer 110 actuate one or more vehicle components 125 to operate the vehicle 105 in the environment based on the instructions from the computer 150. In such an example, the vehicle computer 110 may accept the instructions based on a transmitted vehicle identifier matching a stored vehicle identifier, as described above. Additionally, or alternatively, the computer 150 could store the data in the data store 155. The process 300 ends following the block 340.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
    based on an image from a stationary sensor, detect a marker displayed on one or more digital displays on a vehicle, wherein the marker is displayed for a time duration below a threshold immediately after a set of content is displayed for a time duration above the threshold;
    determine a first location and a first orientation of the marker in a coordinate system by analyzing pixels in the image; and
    based on a stationary sensor location and orientation from a map, determine a second location and a second orientation of the vehicle in the coordinate system.

2. The system of claim 1, wherein the marker is an identifier of the vehicle.

3. The system of claim 1, wherein the instructions further include instructions to receive the map from a remote computer, wherein the remote computer is programmed to perform simultaneous localization and mapping (SLAM) to generate the map, including the stationary sensor location and orientation, and to transmit the map to the computer.

4. The system of claim 1, wherein the instructions further include instructions to, upon determining the second location and the second orientation of the vehicle in the coordinate system, include the vehicle in the map.

5. The system of claim 4, wherein the instructions further include instructions to determine dimensions of the vehicle based on the marker.

6. The system of claim 4, wherein the instructions further include instructions to provide the map to the vehicle and operate the vehicle based on the map.

7. The system of claim 1, wherein the instructions further include instructions to identify the one or more digital displays based on video data from the stationary sensor.

8. The system of claim 1, wherein the instructions further include instructions to determine the first location and the first orientation of the marker based on at least one of marker indicia and dimensions of the marker.

9. The system of claim 1, wherein the instructions further include instructions to determine the first location and the first orientation of the marker by inputting the image from the stationary sensor into a machine learning program.

10. The system of claim 1, wherein the instructions further include instructions to identify the marker based on a visual pattern of the marker.

11. The system of claim 1, wherein the instructions further include instructions to identify the marker based on comparing marker indicia in the image to marker indicia in stored marker images.

12. A method comprising:
    based on an image from a stationary sensor, detecting a marker displayed on one or more digital displays on a vehicle, wherein the marker is displayed for a time duration below a threshold immediately after a set of content is displayed for a time duration above the threshold;

determining a first location and a first orientation of the marker in a coordinate system by analyzing pixels in the image; and based on a stationary sensor location and orientation from a map, determining a second location and a second orientation of the vehicle in the coordinate system.

13. The method of claim 12, further comprising determining the first location and the first orientation of the marker based on at least one of marker indicia and dimensions of the marker.

14. The method of claim 12, further comprising determining the first location and the first orientation of the marker by inputting the image from the stationary sensor into a machine learning program.

15. The method of claim 12, wherein the marker is an identifier of the vehicle.

16. The method of claim 12, further comprising identifying the marker based on a visual pattern of the marker.

17. The method of claim 12, further comprising identifying the marker based on comparing marker indicia in the image to marker indicia in stored marker images.

18. The method of claim 12, further comprising identifying the one or more digital displays based on video data from the stationary sensor.

19. The system of claim 1, wherein the instructions further include instructions to, upon determining the second location and the second orientation of the vehicle in the coordinate system, provide the second location and the second orientation to a vehicle computer in the vehicle, wherein the vehicle computer includes a second processor and a second memory, the second memory storing instructions executable by the second processor to operate the vehicle based on the second location and the second orientation.

20. The system of claim 19, wherein the instructions further include instructions to, upon determining the second location and the second orientation of the vehicle in the coordinate system, provide, to a vehicle computer, instructions to operate the vehicle based on the second location and the second orientation.

* * * * *